United States Patent
Stone

(10) Patent No.: US 8,280,360 B2
(45) Date of Patent: *Oct. 2, 2012

(54) SOFTWARE PROGRAM AND METHOD FOR OFFERING PROMOTIONS ON A PHONE

(75) Inventor: Kevin M. Stone, Mountain View, CA (US)

(73) Assignee: Nuance Communications, Inc., Burlington, MA (US)

( * ) Notice: Subject to any disclaimer, the term of this patent is extended or adjusted under 35 U.S.C. 154(b) by 737 days.

This patent is subject to a terminal disclaimer.

(21) Appl. No.: 11/636,172

(22) Filed: Dec. 8, 2006

(65) Prior Publication Data

US 2008/0139223 A1 Jun. 12, 2008

(51) Int. Cl.
*H04M 3/42* (2006.01)
*H04M 15/00* (2006.01)
*G06Q 30/00* (2012.01)

(52) U.S. Cl. ............... 455/417; 455/414.1; 455/415; 379/114.13; 379/114.12; 379/114.1; 705/14.1

(58) Field of Classification Search .............. 455/410, 455/412, 414, 414.1, 417, 415; 379/114.13, 379/114.12, 114.1; 705/14.1
See application file for complete search history.

(56) References Cited

U.S. PATENT DOCUMENTS

| | | | | |
|---|---|---|---|---|
| 4,850,007 A * | 7/1989 | Marino et al. | ............ | 379/114.13 |
| 5,880,770 A * | 3/1999 | Ilcisin et al. | ............ | 348/14.06 |
| 6,181,927 B1 * | 1/2001 | Welling et al. | ............ | 455/414.1 |
| 6,216,111 B1 * | 4/2001 | Walker et al. | ............ | 705/14.13 |
| 6,567,658 B1 * | 5/2003 | Van De Graaf | ............ | 455/412.1 |
| 6,856,673 B1 | 2/2005 | Banks et al. | | |
| 6,907,118 B2 | 6/2005 | Henderson et al. | | |
| 6,917,802 B1 | 7/2005 | Nilsson | | |
| 7,106,851 B2 | 9/2006 | Tang et al. | | |
| 7,113,571 B2 | 9/2006 | Matsubara et al. | | |
| 7,120,235 B2 | 10/2006 | Altberg et al. | | |
| 7,187,761 B2 * | 3/2007 | Bookstaff | ............ | 379/201.01 |
| 7,353,016 B2 | 4/2008 | Roundtree et al. | | |

(Continued)

FOREIGN PATENT DOCUMENTS

GB 2 206 265 A 12/1988

(Continued)

OTHER PUBLICATIONS

International Preliminary Report on Patentability in corresponding PCT Application No. PCT/US2007/025029.
PCT Search Report and Written Opinion in related PCT Application No. PCT/US2007/025024.

*Primary Examiner* — Jinsong Hu
*Assistant Examiner* — Opiribo Georgewill
(74) *Attorney, Agent, or Firm* — Lessani Law Group, PC

(57) ABSTRACT

The present invention includes a method and software application for providing a promotion to a user on a phone. The software application resides on a user's phone and "listens" for phone numbers dialed by a user. In response to the user dialing a phone number, the software determines whether a promotion or an offer for a promotion should be provided to the user. In response to determining to play or offer to play a promotion to the user, the software application on the phone effectively "intercepts" the call and plays to the user either a promotion or an offer to hear about a promotion prior to placing an outbound voice call. The software application may retrieve the promotion from local memory or may connect with a remote server to download an applicable promotion.

51 Claims, 9 Drawing Sheets

| U.S. PATENT DOCUMENTS | | | |
|---|---|---|---|
| 2001/0048737 A1 | 12/2001 | Goldberg et al. | |
| 2004/0091093 A1 | 5/2004 | Bookstaff | |
| 2005/0074102 A1* | 4/2005 | Altberg et al. | 379/114.1 |
| 2005/0286691 A1 | 12/2005 | Taylor et al. | |
| 2006/0098619 A1 | 5/2006 | Nix et al. | |

| FOREIGN PATENT DOCUMENTS | | | |
|---|---|---|---|
| GB | 2 360 418 A | | 9/2001 |
| WO | WO 00/62518 A | | 10/2000 |
| WO | WO 0062518 | * | 10/2000 |

* cited by examiner

SOFTWARE PROGRAM AND METHOD FOR OFFERING PROMOTIONS ON A PHONE

RELATED APPLICATIONS

This application is related to the subject matter of the co-pending, non-provisional patent application titled "Software Program and Method for Providing Promotions on a Phone" filed on Dec. 8, 2006 and having inventor Kevin M. Stone, the contents of which are incorporated by reference as if fully disclosed herein.

BACKGROUND OF THE INVENTION

1. Field of the Invention

This invention relates generally to telecommunications and, more specifically, to a providing promotions to users on a phone.

2. Description of the Background Art

Providing users with promotions when they search the Internet is well in known in the art. Many search engines will display ads to users based on the search terms they enter. The key to effective advertising is to target promotions to the right users. Phone numbers dialed by phone users can be an effective way to target promotions. This is largely an untapped area for targeting promotions to users, although it is known in the art to play an ad to a customer once they call into an Interactive Voice Response System (IVR). For instance, if a user calls the 1-800 number of an airline, they may first hear a promotion related to the airline before being routed to the applicable agent or point in the IVR system. Several companies, such as Bevocal, Inc. and Tellme, Inc., provide applications for IVR systems that can play a promotion to a user at the start of a call.

One deficiency with the foregoing method is that a promotion is not played to a user until a voice call is actually placed to an IVR destination. Consequently, the promotions that are played are usually promotions associated or approved by the party that owns the phone number associated with the IVR system (e.g., the airline that owns the 1-800 number dialed by the user). In such case, it is not possible for a competitor to pay for a promotion to be played when a user dials a phone number for a competing business. Therefore, there is a desire for a decentralized, more flexible way to play promotions to users via the phone.

SUMMARY

The present invention provides a method and software application for offering a promotion to a user that had dialed a phone number on a phone. The software application resides on a user's phone and "listens" for phone numbers dialed by a user. In response to the user dialing a phone number, the software application determines whether or not to play or offer to play a promotion to a user. This determination may be based on one or more factors, such as the phone number dialed by the user, user profile information, and user location. In response to determining to play or offer to play a promotion to the user, the software application on the phone effectively "intercepts" the call and plays to the user either a promotion or an offer to hear about a promotion prior to placing an outbound voice call. The software application may retrieve the promotion from local memory or may connect with a remote server to download an applicable promotion.

In one embodiment, if the user is eligible for a promotion, the phone automatically plays the promotion to the user and then places a call to the phone number dialed by the user. In an alternate embodiment, instead of automatically playing the promotion, the user is offered a chance to hear the promotion. If the user does not respond to the offer within a select period of time, the phone places a call to the dialed phone number without playing the promotion. If the user opts-in to the offer, the promotion is provided to the user. In another alternate embodiment, when a user is eligible for a promotion, the user must make a selection to either listen to the promotion or continue with the call without hearing about the promotion.

DETAILED DESCRIPTION OF THE PREFERRED EMBODIMENTS

Figure 1:
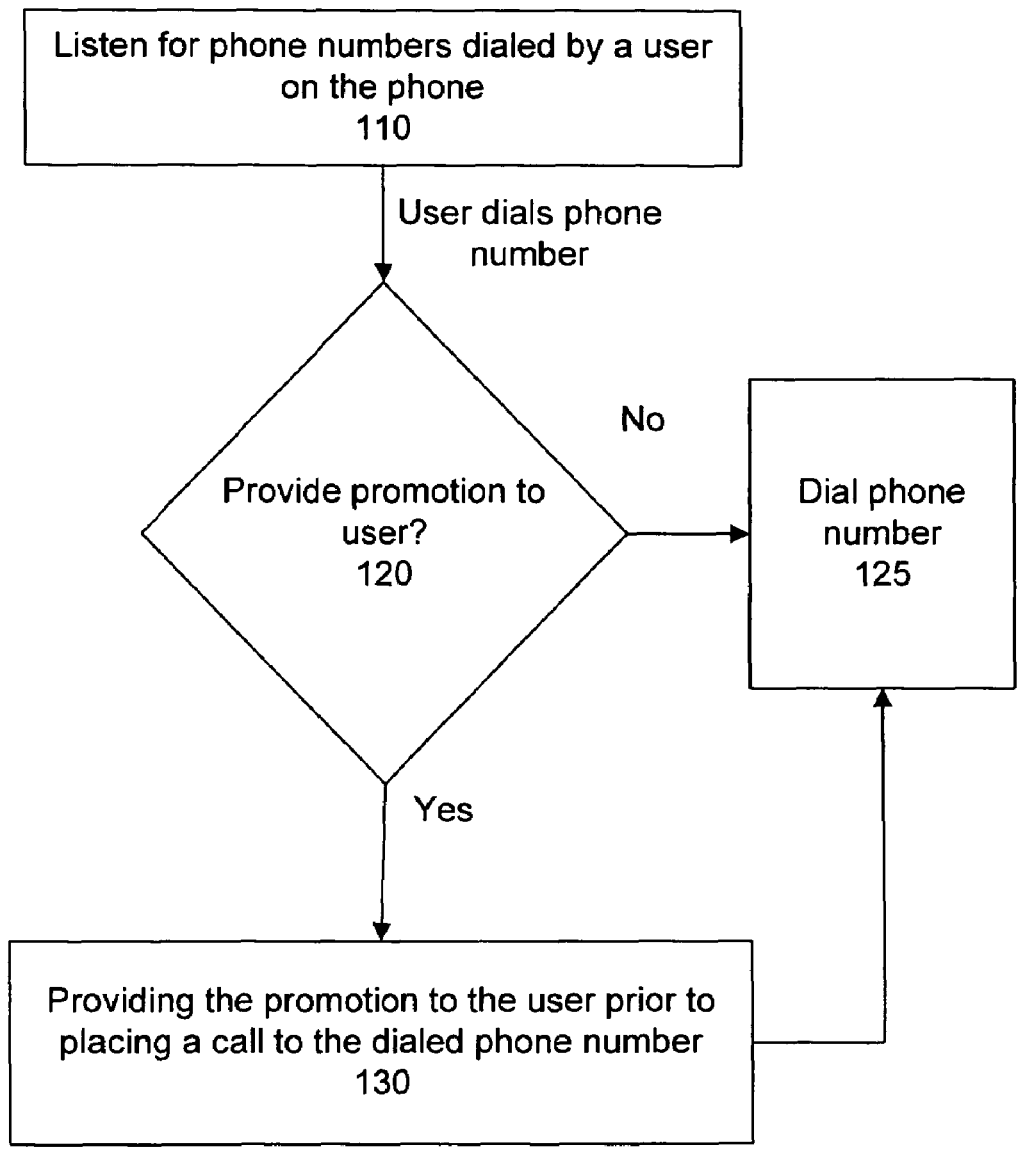
FIG. 1 is a flowchart that illustrates a method for providing a promotion to a user on a phone according to one embodiment of the invention.

FIG. 1 illustrates a method for providing a promotion to a user on a phone according to one embodiment of the present invention. In this embodiment, the method is performed on a phone and enabled by software running on such phone. Types of phones on which this method can be performed include, but are not limited to, phones that receive and transmit voice and/or data via wireless networks, traditional telecommunication networks (i.e., Plain Old Telephone Service (POTS)), and/or the Internet.

The phone (or more specifically, software on the phone) "listens" for phone numbers dialed by a user on the phone (step 110). When a user dials a phone number, software on the phone determines whether or not a promotion should be played to the user (step 120). In one embodiment, this determination is based at least in part on the phone number dialed by the user. Specifically, in such embodiment, a determination is made as to whether or not the phone number is associated with a promotion. Alternate or additional factors in determining whether to play a promotion can include user profile information and user location. Information necessary to make the determination in step 120 may be stored locally on the phone, or the phone may connect with a remote server to download such information (e.g., an application on a remote server may determine whether a promotion should be played to the user and then inform software on the phone of this decision). If a decision is made not to play a promotion to the user, the phone places a call to the dialed phone number (i.e., dials the phone number) (step 125). Otherwise, the phone provides the user with the promotion prior to placing a call to the dialed phone number (step 130). The promotion may be stored locally on the phone or the phone may download the promotion from a server. After playing the promotion, the phone then initiates a call to the dialed phone number (125).

In this embodiment, the promotion may be provided in audio and/or visual form. It can be provided in audio form as a voice prompt, and in visual form as text, graphics, video, and/or flash files in the user interface of the phone.

The promotion can be any type of promotion. Examples of the type of promotions include information about a business associated with or competing with the number being dialed. The promotion may include information about a product offering or sale.

As an example of the method described with respect to FIG. 1, assume there is a promotion associated with a restaurant called "Lake Como Pizza" that is to be played when the user dials the phone number for Lake Como Pizza. When the user dials the phone number for Lake Como Pizza, the user hears something like the following before the call is placed:

"When you order 2 large pizzas at Lake Como, you get a free soft drink and order of breadsticks"

Figure 2:
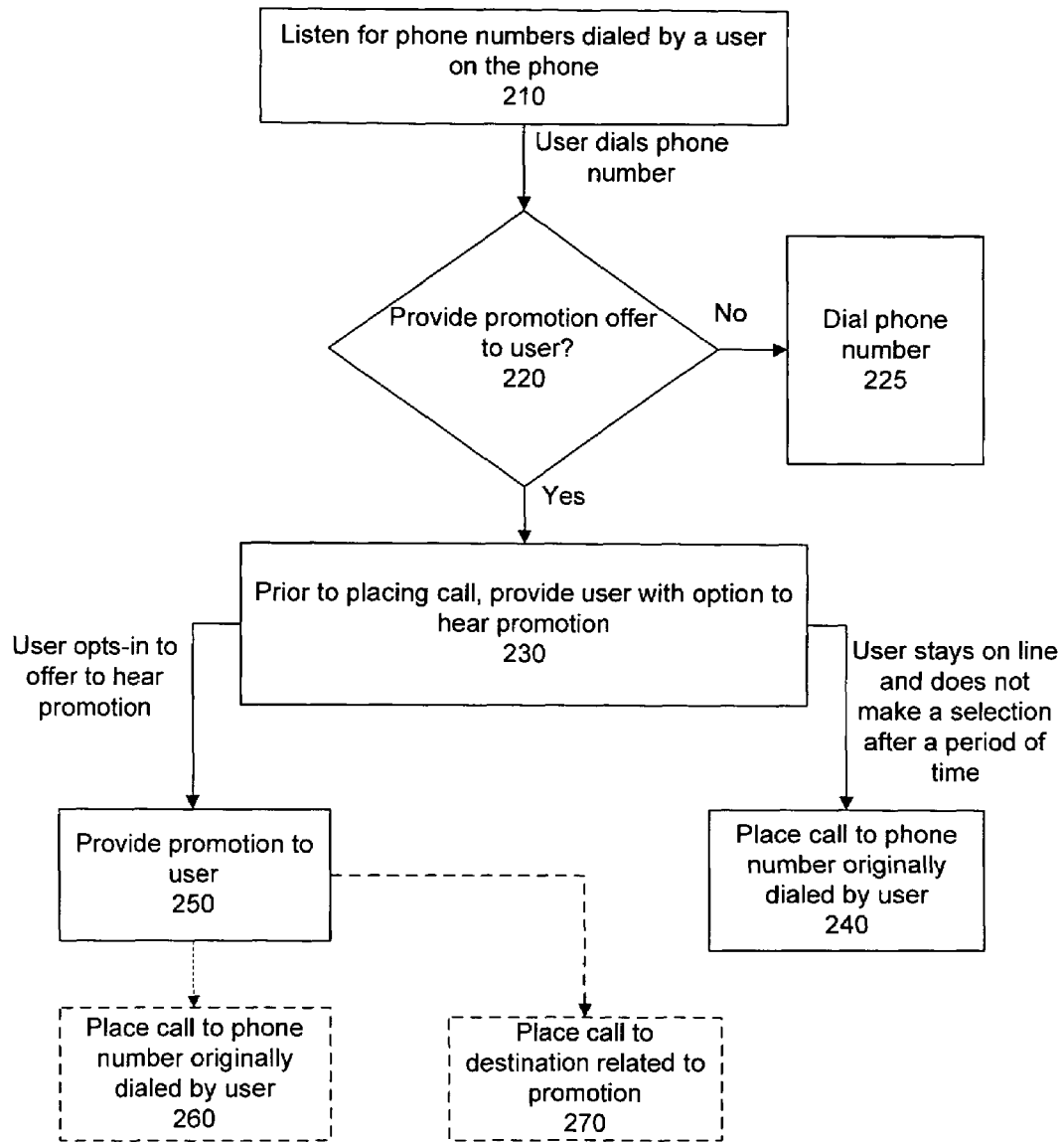
FIG. 2 is a flowchart that illustrates a method for providing a promotion to a user on a phone according to an alternate embodiment of the invention.

FIG. 2 illustrates an alternate embodiment of the invention. Steps 210, 220 and 225 are essentially the same as steps 110, 120, and 125 described above with respect to FIG. 1. However, in this embodiment, if the user is eligible for a promotion, the phone provides the user with an option to hear (and/or see) a promotion prior to placing a voice call (step 230). In this embodiment, if the user elects to continue with the call or does not respond to the offer within a select period of time (for example, 2 seconds), the phone places a call to the number dialed by the user (step 240). If the user opts-in to the offer to hear about (and/or see) the promotion, the phone provides the promotion to the user (step 250). The promotion may include the opportunity to place a call to an alternate number instead of the number dialed by a user. In such case, after the user hears (and/or sees) the promotion, a call could be placed either to an alternate number (step 270) or to the original number dialed by the user (step 260).

As an example of the method described with respect to FIG. 2, assume there is a promotion associated with a restaurant called "Lake Como Pizza" that is to be played when the user dials the phone number for any other local pizza restaurant. When the user dials the phone number for a pizza restaurant, the user hears something like the following before the call is placed:

"Press 1 or hold on to continue with this call. Press 2 to hear about a Lake Como Pizza offer."

If the user presses "2", the user hears the following promotion:

"Get $3 off a Lake Como Pizza order when you mention "phone offer." Dial 1 or stay online to continue with this call. Press 2 to dial Lake Como Pizza instead."

Figure 4A:
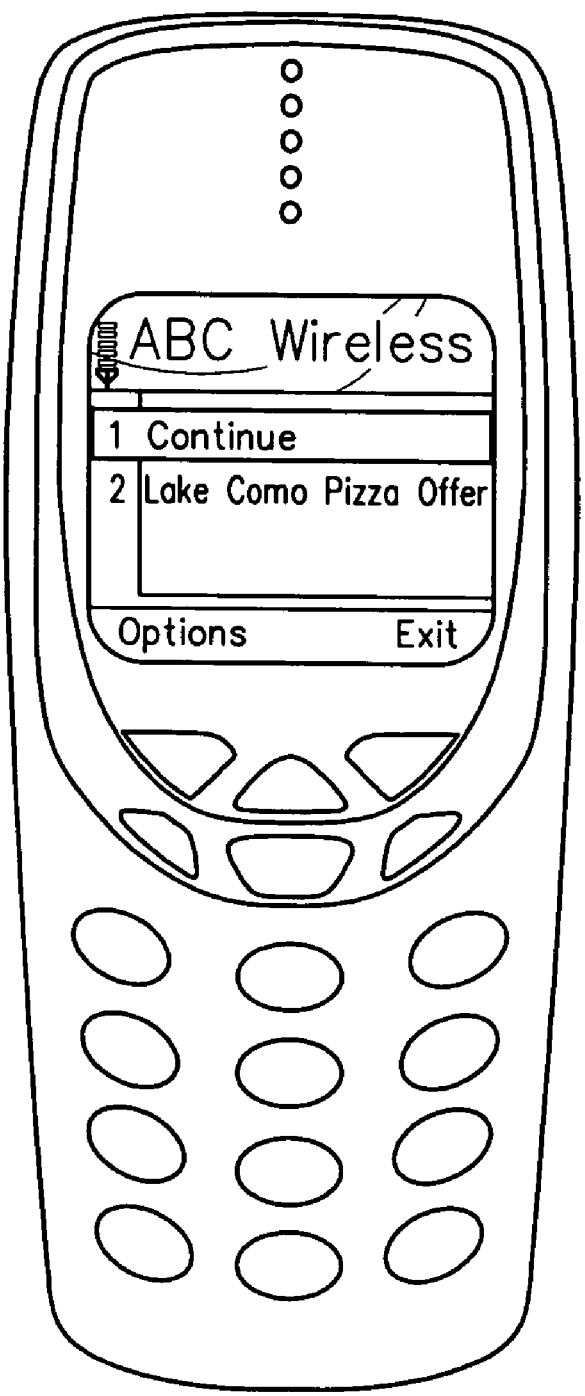
FIGS. 4*a* and 4*b* are drawings of a wireless phone with a user interface that illustrate example text associated with providing a promotion to a user.
Figure 4B:
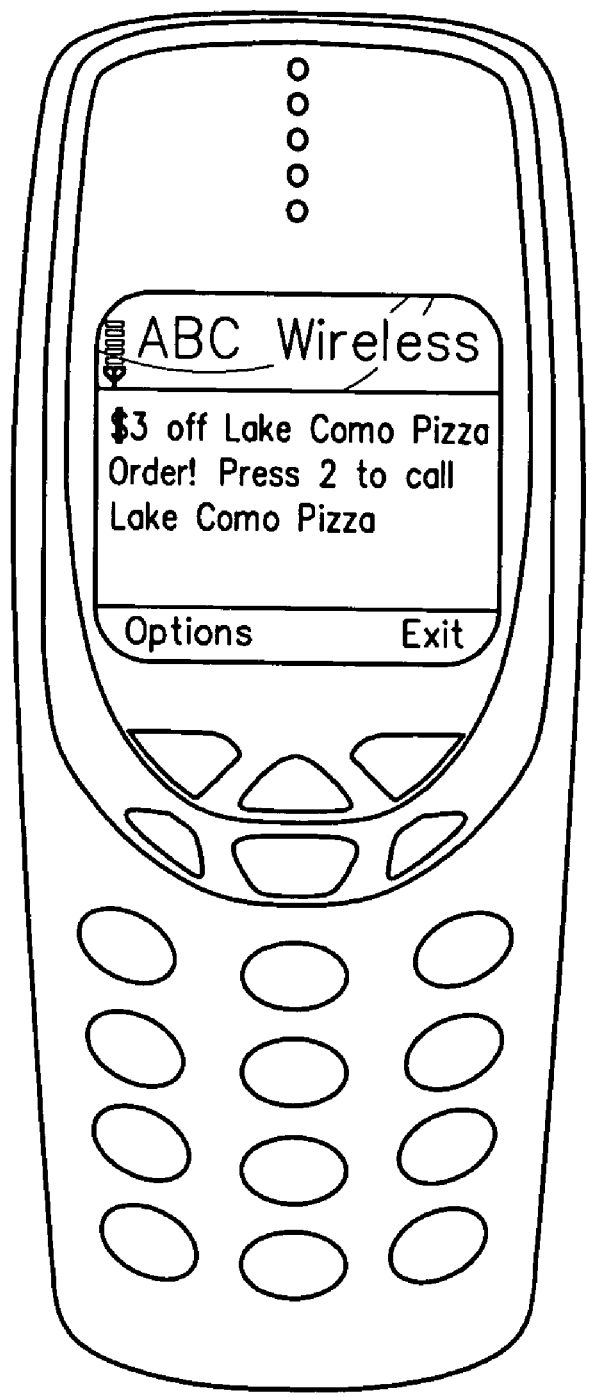

FIGS. 4a and 4b illustrate an example of the text that can be displayed in the user interface to correspond to the above voice prompts.

Figure 3:
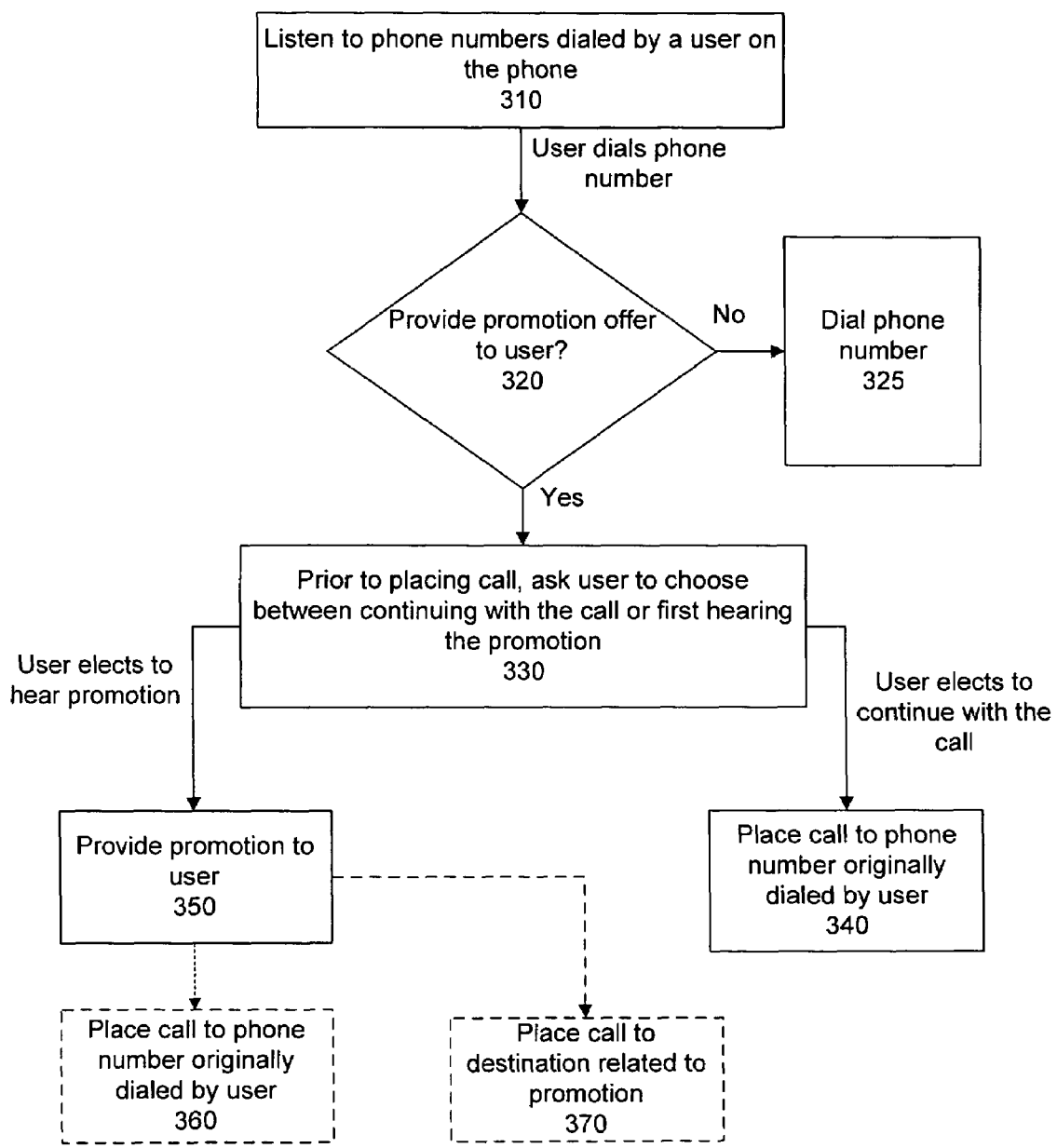
FIG. 3 is a flowchart that illustrates a method for providing a promotion to a user on a phone according to a further alternate embodiment of the invention.

FIG. 3 illustrates an alternate embodiment of the invention. It is similar to the method illustrated in FIG. 2, except that, if the user is eligible for a promotion, the phone asks to the user to choose between continuing with the call or first hearing (and/or seeing) the promotion (i.e., the user must make a selection) (step 330). If the user elects to continue with the call, the phone places a call to the number originally dialed by the user (340). If the user elects to hear the promotion, the phone plays the promotion to the user (step 350). The promotion may include the opportunity to place a call to an alternate number instead of the number dialed by the user. In such case, after the user hears the promotion, a call could be placed either to alternate number (step 370) or to the original number dialed by the user (step 360). Steps 310, 320, and 325 are the same as steps 210, 220, and 225 described with respect to FIG. 2.

As an example of the method described with respect to FIG. 4, assume once again that there is a promotion associated with a restaurant called "Lake Como Pizza" that is to be played when a user dials a phone number for any other local pizza restaurant. When the user dials the phone number for a pizza restaurant, the user hears something like the following before an outbound call is initiated:

"Press or say 1 to continue with this call. Press or say 2 to hear more about a Lake Como Pizza offer."

In this example, the user must make a choice before further action takes place. If the user presses or says "1," the phone initiates an outbound call to the number dialed by the user. If the user says or presses "2," the Lake Como Pizza promotion is played to the user (such as the example promotion set forth above).

Figure 5:
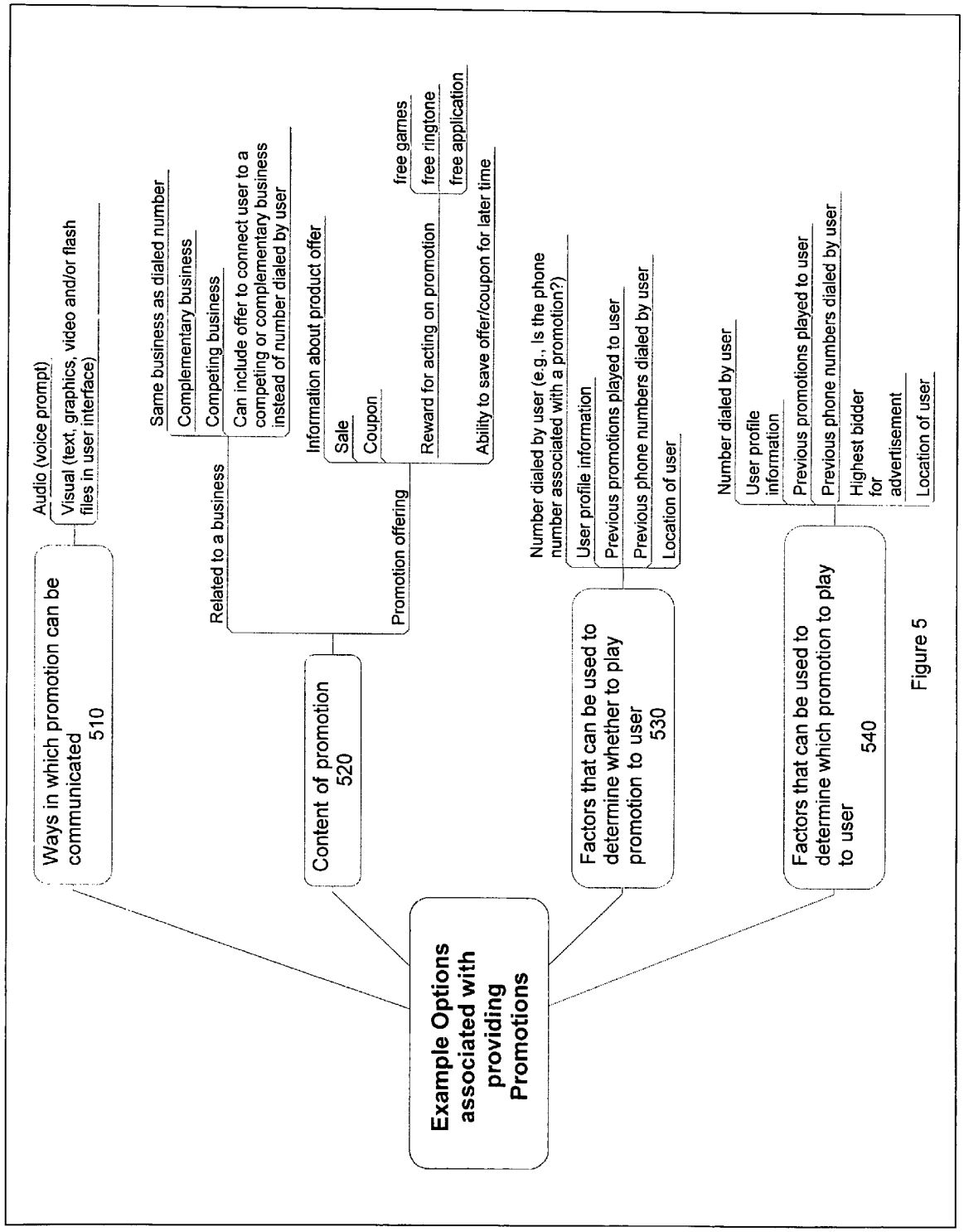
FIG. 5 is a mind map that illustrates example options associated with providing promotions to users.

FIG. 5 illustrates the following: example ways in which a promotion can be communicated (510); content options for promotions (520); example factors that can be used to determine whether a user is eligible for a promotion (530); and, if the user is eligible for a promotion, example factors that can be used to determine which promotion to play to a user (540). FIG. 5 illustrates just some of the possibilities associated with providing promotions (i.e., these are just examples), and the invention is in no way limited to the options illustrated in and discussed with respect to FIG. 5.

With respect to ways in which promotions can be communicated (510), the promotion can be communicated in audio and/or visual form, as discussed above. With respect to content of promotions (520), the content of the promotion may relate to a business associated the number dialed by the user, or to a business that is complementary to or competing with such business. The promotion may include an offer to connect a user to a competing or complementary business instead of the number dialed by the user. The promotion may include information about a product offer or a sale associated with a business. It may also include a coupon, or a reward for acting upon a product offer (e.g., free game or other application, free ringtone, etc.). The promotion may also include the ability to save the promotion information (or coupon in the promotion) for a later time.

One or more factors can be used to determine which promotion to play to the user (540). For example, selection of the promotion may be based on the number dialed by the user, user profile information (in the case of wireless phone users, this can be user profile information collected by a wireless communication carrier), previous promotions played to a user, and/or previous phone numbers dialed by a user. Also, promotion slots, may be sold or auctioned off to advertisers, and, in such cases, the promotion played to the user may be the promotion desired by the advertiser that paid for such promotion slot.

With respect to factors that can be user to determine whether to play a promotion to a user (530) (i.e., whether a user is eligible for a promotion), such determination can be based on one or more factors. One factor can be whether or not the phone number dialed by the user is associated with a promotion. Other factors can include user profile information, previous promotions played to user, previous phone numbers dialed by the user, and the location of the user.

The voice or data files with voice prompts and text/graphics/videos/files for promotions may be stored locally on the phone or remotely on a server with which the phone communicates. In the preferred embodiment, when the user dials a phone number, software on the phone connects to a remote server to check whether or not the user is eligible for a promotion. If so, the promotion is downloaded to the phone from the server, and the phone then plays or offers to play the promotion to the user. In an alternate embodiment, promotions for select phone numbers are periodically downloaded (i.e., "pushed") to the phone.

In one embodiment, "listening" to a phone number involves (1) monitoring the sequence of keystrokes entered by a user prior to a user hitting the "send," "call," "dial," or other button associated with dialing a call and/or (2) monitoring phone numbers entered through voice-activated dialing (such as when a user says "voice mail" to dial the phone number for voice mail). A phone number is not limited to a seven or ten digit phone number for the purposes of this invention. Rather, it can be any sequence of numbers or characters that can be used to generate an outbound call. For example, shortcut phone numbers (such as 411 or *669) can be phone numbers for the purposes of this invention.

In alternate embodiment of the methods described with respect to FIGS. 1-3, such methods do not include the step of determining whether or not to provide the user with a promotion or an offer for a promotion (steps 120, 220, and 320). Instead, every time the user makes a phone call, the user is automatically provided a promotion or an offer for a promotion.

Figure 6:
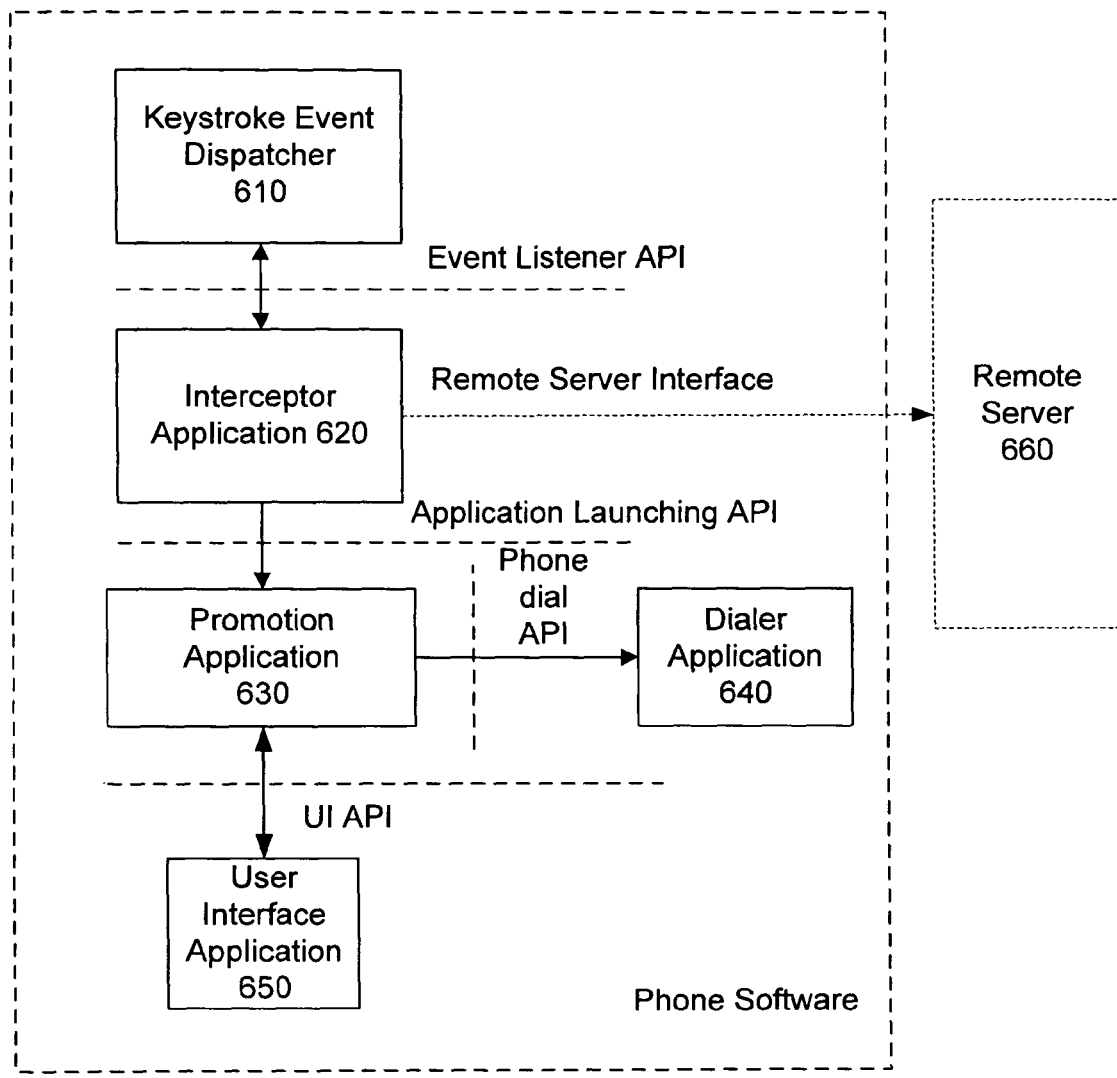
FIG. 6 is block diagram representation of software on a phone that can be used to implement one embodiment of the present invention.

FIG. 6 illustrates an example of software on a digital phone that can be used to implement the present invention. For ease of explanation, such software can be thought of as divided into various functional modules. These modules are a keystroke event dispatcher 610, an interceptor application 620, a promotion application 630, a dialer application 640, and a user interface application 650. Keystroke event dispatchers, user interface applications, and dialer applications are well known in the art.

Figure 7:
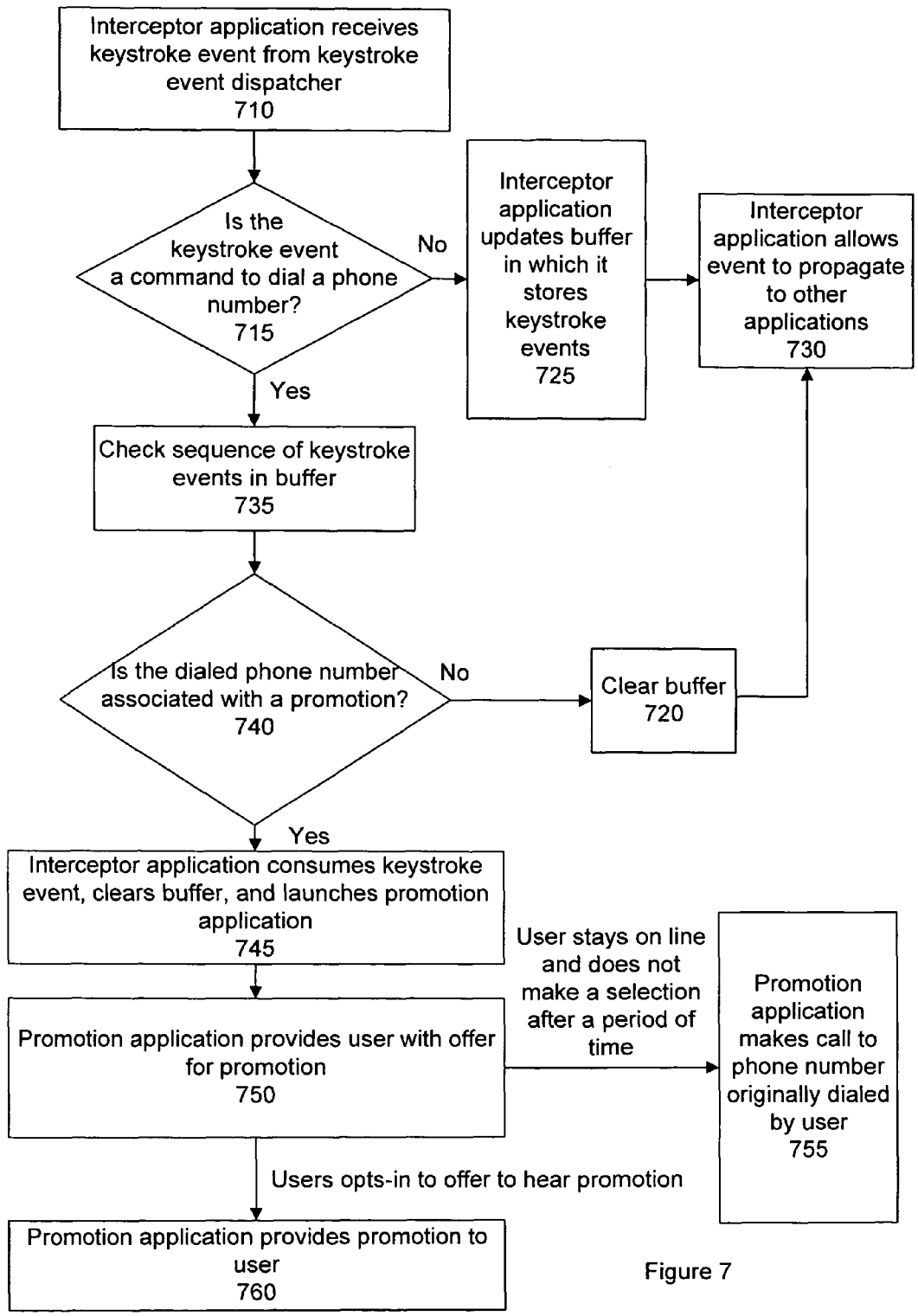
FIG. 7 is a flowchart that illustrates operations of the interceptor and promotion modules.
Figure 8:
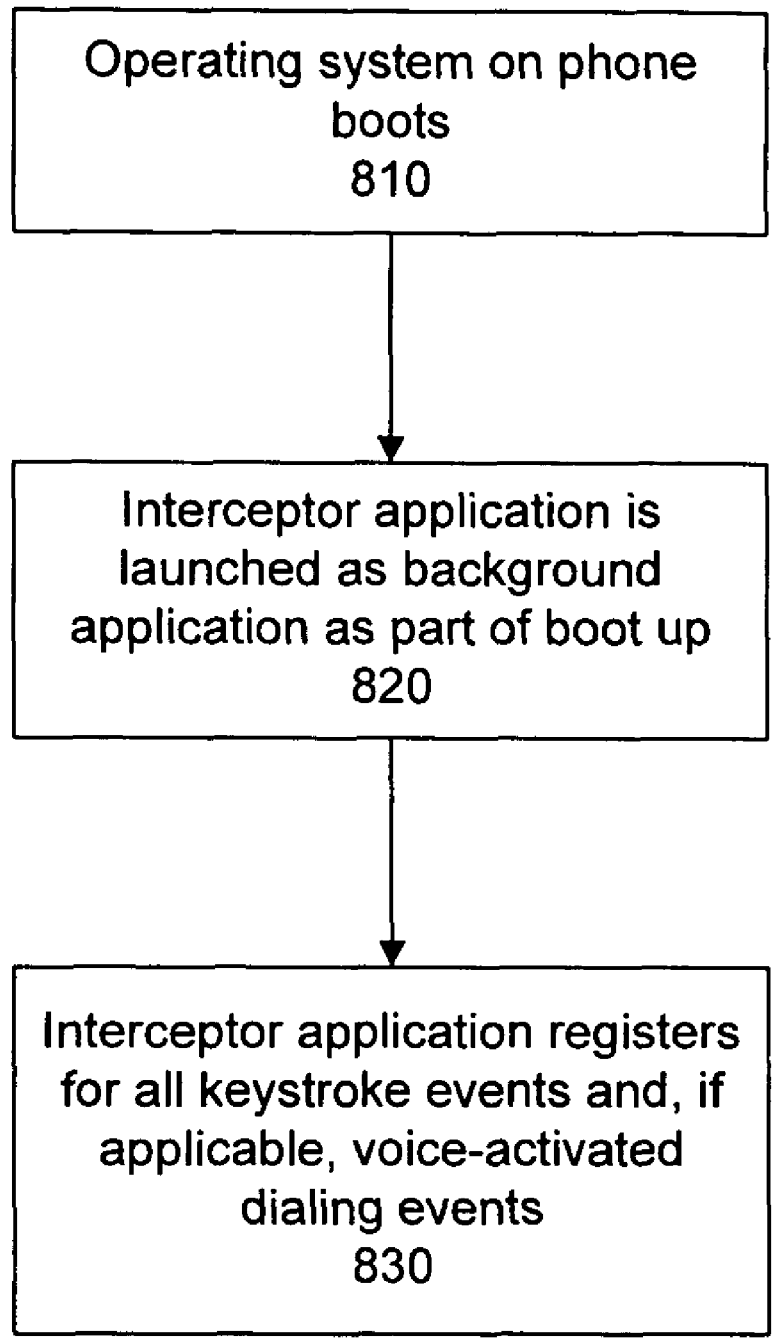
FIG. 8 is a flowchart that illustrates the start-up of the inceptor module.

Those skilled in the art will appreciate that a phone will include additional functionality not represented by the above modules. However, such functionality is well known in the art and a discussion of such functionality is not relevant for an understanding of the invention described herein. Moreover, those skilled in the art will appreciate that there may be many ways to implement the present invention, and the software implementation described herein with respect to FIGS. 6-8 is just one example of an implementation.

The keystroke event dispatcher 610 buffers keystrokes entered by the phone user and provides such keystrokes to other applicable applications on the phone that register for keystroke events. The dialer application 640 registers for keystroke events and dials phone numbers entered by the user, unless such phone numbers are first consumed by the interceptor application 620. The user interface application 650 enables the display of information in the user interface on the phone.

The interceptor application 620 and the promotion applications 630 are the modules that perform the functions described with respect to FIGS. 1-3. The interceptor application 620 registers for keystroke events (as a higher priority application than the dialer module 640) and listens for phone numbers. The interceptor application 620 communicates with the keystroke event dispatcher 610 via an applicable event listener application programming interface (API).

The promotion application 630 is launched by the interceptor application 620 in response to the interceptor application 630 determining that a user should be played or offered a promotion. The promotion application 630 provides the user with the promotion or the option to obtain the promotion.

FIG. 7 illustrates one way in which the interceptor application 620 and the promotion application 630 can operate to implement the method described with respect to FIG. 2. In this embodiment, determining whether a user is eligible for a promotion comprises determining whether the phone number dialed by the user is associated with a promotion. This is just one example of an implementation and the invention is not limited to this example. When a user hits a key on a phone, the interceptor application 620 receives the keystroke event from the keystroke event dispatcher 610 (step 710). The interceptor application 620 then determines if the key the user entered is a command to dial a phone number (such as the "send" or "dial" button on a wireless, mobile phone) (step 715). If it is not, the interceptor application 620 updates a buffer in which it stores keystroke events (step 725) and lets the event propagate to other listeners of keystrokes, such as the dialer application 640 (step 730). If it is a command to dial a phone number, the interceptor application 620 checks the buffer (step 735) and determines whether the dialed phone number (i.e., the sequence in the buffer) is associated with a promotion (step 740). Determining whether a phone number is associated with a promotion may involve checking with a remote server 660 (such as, for example, a server operated by or on behalf of a wireless communication carrier). If the phone number is not associated with a promotion, the interceptor application 620 clears the buffer (step 720) and lets the keystroke event propagate to other listeners (step 730). If the phone number is associated with a promotion, the interceptor application 620 consumes the keystroke event (i.e., the event is not propagated to other software modules on the phone), clears the buffer, and launches the promotion application 630 (step 745).

If the phone has voice-activated dialing, the interceptor application 620 can also receive voice-activated dial events and launch the promotion application 630 when a voice-activated dial command corresponds to a promotion.

When launched, the promotion application 630 provides the user with an option to hear a promotion associated with the phone number dialed by the user or to stay online and continue with the call (step 750). In one embodiment, if the user stays online and does not make a selection after a period of time, the promotion application 630 makes the call to the phone number originally dialed by the user (or instructs the dialer application to make such call) (step 755). In one embodiment, the promotion application 630 uses an applicable phone call API to make the call.

If the user elects to hear the promotion, the promotion application 630 provides the applicable promotion to the user (760). Depending on the implementation, the promotion application 630 may retrieve the promotion file from local storage on the phone or from a remote server 660. The promotion application 630 or a remote server (if applicable) may apply pre-programmed rules to determine which promotion to play to the user. The rules may weigh various factors, such as the factors 530 illustrated in FIG. 5. Applying rules to select which advertisements/promotions to play to users is well known in the art.

After the user plays the promotion to the user, the promotion application 630 may dial (or instruct the dialer application to dial) the phone number originally dialed by the user. Alternately, if the promotion included an option to dial an alternate number and this option was accepted by the user, the promotion application 630 will dial (or instruct the dialer application to dial) the alternate phone number.

FIG. 8 illustrates the start up of the interceptor application 620. When the operating system on the phone boots (step 810), the interceptor application 620 is launched as a background application (step 820). The interceptor application 620 then registers for all keystroke events and, if applicable, voice-activated dialing events (step 830), where the interceptor application 620 will receive keystroke events and, if applicable, voice-activated dialing events before any foreground applications, such as the dialer application 640. In some systems, the interceptor application 620 may need to register as a high priority application.

In the preferred embodiment, the requirements for the interceptor application 620 include the following:

- Able to receive all keystroke events and, if applicable, voice-activated dialing events at all times
- Able to consume keystroke events and, if applicable, voice-activated dialing events (so that consumed events are not passed to the dialer application 640)
- Able to launch other applications, namely, the promotion application 630.

In the preferred embodiment, the requirements for the promotion application 630 include the following:

- Able to play audio prompts
- Able to display text of promotion in user interface
- Able to support timers (so that if the user does not select an option after a period of time, the promotion application 630 can place a call or have a call placed to the originally dialed phone number)
- Able to make phone calls or have phone calls made.

The invention is in no way limited to the above requirements. They merely reflect one way in which to implement the invention.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for offering a promotion to a user that has entered a command on a phone to place a call to a phone number, the method comprising:
    listening on the phone for a command from a user to place a call to a phone number;
    in response to the user entering such command, performing the following:
        providing the user with an option to receive a promotion, wherein the option is initiated by an application local on the phone that consumes the command to prevent the phone from immediately initiating an outbound call in order to provide the option prior to the phone initiating an outbound voice call;
        in response to the user accepting the option, providing the user with the promotion, wherein the promotion is a product offering for a business that is competitive with a business associated with the phone number and includes an offer to perform an alternate action and, in response to the user accepting such offer, the phone initiates such alternate action instead of placing a call to the phone number; and
        in response to the user not responding to the option or not accepting the offer, placing a call to the phone number.

2. A method for offering a promotion to a user that has entered a command on a phone to place a call to a phone number, the method comprising:
    listening on the phone for a command from a user to place a call to a phone number;
    in response to the user entering such command, determining whether or not to offer a promotion to the user, wherein such determination is made prior to the phone initiating an outbound voice call to the phone number;
    in response to determining to offer a promotion to the user, performing the following:
        providing the user with an option to receive a promotion, wherein the option is initiated by an application local on the phone that consumes the command to prevent the phone from immediately initiating an outbound call in order to provide the option prior to the phone initiating an outbound voice call;
        in response to the user accepting the option, providing the user with the promotion, wherein the promotion is a product offering for a business that is competitive with a business associated with the phone number and includes an offer to perform an alternate action and, in response to the user accepting such offer, the phone initiates such alternate action instead of placing a call to the phone number; and
        in response to the user not responding to the option or not accepting the offer, placing a call to the phone number.

3. The method of claim 2, wherein providing the promotion comprises providing a promotion for a business associated with the phone number.

4. The method of claim 3, wherein the promotion is information about the business.

5. The method of claim 3, wherein the promotion is a product offering by the business.

6. The method of claim 3, wherein the promotion is a sale offered by the business.

7. The method of claim 3, wherein the promotion offers a reward for purchasing a product from the business.

8. The method of claim 2, wherein, the alternate action is placing a call to the competing business.

9. The method of claim 2, wherein the promotion is a discount off a product offered by the competing business.

10. The method of claim 2, wherein the promotion includes a coupon.

11. The method of claim 2, wherein providing the promotion includes providing the user with the option to save the promotion on the user's phone.

12. The method of claim 2, wherein the option to receive information about the promotion is provided in audio form on the phone by playing a voice prompt.

13. The method of claim 2, wherein the option to receive information about the promotion is provided in visual form on the phone by displaying the option on a user interface on the phone.

14. The method of claim 2, wherein the promotion is provided to the user in audio form on the phone by playing a voice prompt.

15. The method of claim 2, wherein the promotion is provided to the user in visual form by displaying text describing the promotion on a user interface on the phone.

16. The method of claim 2, wherein the promotion provided to the user is selected based at least in part on user profile information.

17. The method of claim 2, wherein the promotion provided to the user is selected based at least in part on user location.

18. The method of claim 2, wherein the promotion provided to the user is selected based at least in part on known user preferences.

19. The method of claim 2, wherein the promotion provided to the user is selected based at least in part on previous promotions offered the user.

20. The method of claim 2, wherein the promotion provided to the user is selected based at least in part on previous phone numbers dialed by user.

21. The method of claim 2, wherein the promotion provided to the user is paid for by an advertiser and wherein the promotion provided to the user is selected at least in part based on the advertiser that bid the most money for promotion placement.

22. The method of claim 2, wherein determining whether or not to play a promotion to a user comprises determining whether the phone number is associated with a promotion.

23. The method of claim 22, wherein determining whether the phone number is associated with a promotion comprises communicating with a remote server to determine whether the phone number is associated with a promotion, and, if the phone number is associated with a promotion, downloading the promotion from the server.

24. A method for offering a promotion to a user that has entered a command on a phone to place a call to a phone number, the method comprising:
   listening on the phone for a command from a user to place a call to a phone number;
   in response to the user entering such command, determining whether or not to offer a promotion to the user, wherein such determination is made prior to the phone initiating an outbound voice call to the phone number;
   in response to determining to offer a promotion to the user, performing the following:
      providing the user with a choice to either continue with the call or to first receive information about the promotion, wherein the choice is provided by an application local on the phone that consumes the command to prevent the phone from immediately initiating an outbound call in order to provide the choice prior to the phone initiating an outbound voice call;
      in response to the user selecting to receive information about the promotion, providing the user with information about the promotion, wherein the information is about a product offering for a business that is competitive with a business associated with the phone number and includes an offer to perform an alternate action and, in response to the user accepting such offer, the phone initiates such alternate action instead of placing a call to the phone number; and
      in response to the user selecting to continue with the call or not accepting the offer, placing a call to the phone number.

25. The method of claim 24, wherein providing the promotion comprises providing a promotion for a business associated with a phone number.

26. The method of claim 25, wherein the promotion is information about the business.

27. The method of claim 25, wherein the promotion is a product offering by the business.

28. The method of claim 25, wherein the promotion is a sale offered by the business.

29. The method of claim 25, wherein the promotion offers a reward for purchasing a product from the business.

30. The method of claim 24, wherein, the alternate action is placing a call to the competing business.

31. The method of claim 24, wherein the promotion is a discount off a product offered by the competing business.

32. The method of claim 24, wherein the promotion includes a coupon.

33. The method of claim 24, wherein, in providing user with information about the promotion, providing the user with the option to save the promotion on the user's phone.

34. The method of claim 24, wherein the option to receive information about the promotion is provided in audio form on the phone by playing a voice prompt.

35. The method of claim 24, wherein the option to receive information about the promotion is provided in visual form on the phone by displaying the option on a user interface on the phone.

36. The method of claim 24, wherein the promotion is provided to the user in audio form on the phone by playing a voice prompt.

37. The method of claim 24, wherein the promotion is provided to the user in visual form by displaying text describing the promotion on a user interface on the phone.

38. The method of claim 24, wherein the promotion provided to the user is selected based at least in part on user profile information.

39. The method of claim 24, wherein the promotion provided to the user is selected based at least in part on user location.

40. The method of claim 24, wherein the promotion provided to the user is selected based at least in part on known user preferences.

41. The method of claim 24, wherein the promotion provided to the user is selected based at least in part on previous promotions offered the user.

42. The method of claim 24, wherein the promotion provided to the user is selected based at least in part on previous phone numbers dialed by user.

43. The method of claim 24, wherein the promotion provided to the user is paid for by an advertiser and wherein the promotion provided to the user is selected at least in part based on the advertiser that bid the most money for promotion placement.

44. The method of claim 24, wherein determining whether or not to play a promotion to a user comprises determining whether the phone number is associated with a promotion.

45. A non-transitory computer-readable medium comprising software code that, when executed by a processor on a phone, enables the phone to perform the following method:
   listening on the phone for a command from a user to place a call to a phone number;
   in response to the user entering such command, determining whether or not to offer a promotion to the user, wherein such determination is made prior to the phone initiating an outbound voice call to the phone number;
   in response to determining to offer a promotion to the user, performing the following:
      providing the user with an option to receive information about the promotion, wherein the option is initiated by an application local on the phone that consumes the command to prevent the phone from immediately initiating an outbound call in order to provide the option prior to the phone initiating an outbound voice call;
      in response to the user accepting the option, providing the user with information about the promotion, wherein the information is about a product offering for a business that is competitive with a business associated with the phone number and includes an offer to perform an alternate action and, in response to the user accepting such offer, the phone initiates such alternate action instead of placing a call to the phone number; and
      in response to the user not responding to the option or not accepting the offer, placing a call to the phone number.

46. The non-transitory computer-readable medium of claim 45, wherein determining whether or not to play a promotion to a user comprises determining whether the phone number is associated with a promotion.

47. A non-transitory computer-readable medium comprising software code that, when executed by a processor on a phone, enables the phone to perform the following method:
  listening on the phone for a command from a user to place a call to a phone number;
  in response to the user entering such command, determining whether or not to offer a promotion to the user, wherein such determination is made prior to the phone initiating an outbound voice call to the phone number;
  in response to determining to offer a promotion to the user, performing the following:
    providing the user with a choice to either continue with the call or to first receive information about the promotion, wherein the choice is provided by an application local on the phone that consumes the command to prevent the phone from immediately initiating an outbound call in order to provide the choice prior to the phone initiating an outbound voice call;
    in response to the user selecting to receive information about the promotion, providing the user with information about the promotion, wherein the information is about a product offering for a business that is competitive with a business associated with the phone number and includes an offer to perform an alternate action and, in response to the user accepting such offer, the phone initiates such alternate action instead of placing a call to the phone number; and
    in response to the user selecting to continue with the call, placing a call to the phone number.

48. The non-transitory computer-readable medium of claim 47, wherein determining whether or not to play a promotion to a user comprises determining whether the phone number is associated with a promotion.

49. A method for offering a promotion to a user that has entered a command on a phone to place a call to a phone number, the method comprising:
  listening on the phone for a command from a user to place a call to a phone number;
  in response to the user entering such command, determining whether or not to offer a promotion to the user, wherein such determination is made prior to the phone initiating an outbound voice call to the phone number and wherein the promotion is a product offering for a business that is competitive with a business associated with the phone number;
  in response to determining to offer a promotion to the user, performing the following:
    providing the user with an option for an alternate action related to the promotion, wherein the option is initiated by an application local on the phone that consumes the command to prevent the phone from immediately initiating an outbound call in order to provide the option prior to the phone initiating an outbound voice call;
    in response to the user accepting the option, performing the alternate action related to the promotion instead of placing a call to the phone number; and
  in response to the user not responding to the option, placing a call to the phone number.

50. A non-transitory computer-readable medium comprising software code that, when executed by a processor on a phone, enables the phone to perform the following method:
  listening on the phone for a command from a user to place a call to a phone number;
  in response to the user entering such command, determining whether or not to offer a promotion to the user, wherein such determination is made prior to the phone initiating an outbound voice call to the phone number;
  in response to determining to offer a promotion to the user, performing the following:
    providing the user with an option to receive a promotion, wherein the option is initiated by an application local on the phone that consumes the command to prevent the phone from immediately initiating an outbound call in order to provide the option prior to the phone initiating an outbound voice call;
    in response to the user accepting the option, providing the user with the promotion, wherein the promotion is for a business that is competitive with a business associated with the phone number and includes an offer to perform an alternate action of placing a call to the competing business and, in response to the user accepting such offer, the phone initiates such alternate action instead of placing a call to the phone number; and
    in response to the user not responding to the option or not accepting the offer, placing a call to the phone number.

51. A non-transitory computer-readable medium comprising software code that, when executed by a processor on a phone, enables the phone to perform the following method:
  listening on the phone for a command from a user to place a call to a phone number;
  in response to the user entering such command, determining whether or not to offer a promotion to the user, wherein such determination is made prior to the phone initiating an outbound voice call to the phone number;
  in response to determining to offer a promotion to the user, performing the following:
    providing the user with an option to receive a promotion, wherein the option is initiated by an application local on the phone that consumes the command to prevent the phone from immediately initiating an outbound call in order to provide the option prior to the phone initiating an outbound voice call;
    in response to the user accepting the option, providing the user with the promotion, wherein the promotion is a discount off a product offered by a business that is competitive with a business associated with the phone number and includes an offer to perform an alternate action and, in response to the user accepting such offer, the phone initiates such alternate action instead of placing a call to the phone number; and
    in response to the user not responding to the option or not accepting the offer, placing a call to the phone number.

* * * * *